(12) United States Patent
Lee

(10) Patent No.: US 6,354,649 B1
(45) Date of Patent: Mar. 12, 2002

(54) MONITOR INSTALLED IN DASH PANEL OF AUTOMOBILE AND ITS USAGE

(76) Inventor: Won Jong Lee, 2407-802 Dongshin Apt., Haetbit Maeul, 958, Heng-shin-dong, Duckyang-gu, Koyang-City, Kyunggi-do 412-230 (KR)

( * ) Notice: Subject to any disclaimer, the term of this patent is extended or adjusted under 35 U.S.C. 154(b) by 0 days.

(21) Appl. No.: 09/599,803

(22) Filed: Jun. 22, 2000

Related U.S. Application Data

(63) Continuation of application No. PCT/KR99/00044, filed on Feb. 2, 1999.

(30) Foreign Application Priority Data

Jun. 15, 1998 (KR) .............................. 98/22347

(51) Int. Cl.[7] .............................................. B62D 25/14
(52) U.S. Cl. ................... 296/70; 296/37.1; 296/37.8; 296/37.12; 74/89.2; 185/39; 348/837
(58) Field of Search .............................. 296/37.1, 37.8, 296/37.12, 70; 348/837; 185/37, 39; 74/89.2, 89.22

(56) References Cited

U.S. PATENT DOCUMENTS 4,684,164 A * 8/1987 Durham ..................... 296/37.7
4,712,823 A * 12/1987 Mills et al. ................. 296/37.8
4,733,900 A * 3/1988 Fluharty ..................... 296/37.8
6,049,288 A * 4/2000 Kawasaki ................... 348/288

FOREIGN PATENT DOCUMENTS

| DE | 4213129 | 10/1993 |
| DE | 4338579 | 7/1994 |
| DE | 4441745 | 6/1995 |
| EP | 0420708 | 4/1991 |
| EP | 0551078 | 10/1996 |
| KR | 20169 | 9/1993 |

* cited by examiner

Primary Examiner—Stephen T. Gordon
Assistant Examiner—Lori L. Coletta
(74) Attorney, Agent, or Firm—Ladas & Parry

(57) ABSTRACT

A monitor installed in automobile's dash panel (110), includes: a reception member (120) inserted in the upper portion of the dash panel (110), the member having a predetermined space and opened top; a lid (130) hinged on one side of the reception member (120) so that is selectively opened or closed; lid opening means for controlling the opening or closing the lid (130); and a monitor (140) installed in the reception member (120) and hinged on the top inner surface of the lid (130) so that it becomes selectively erect when the lid (130) is opened.

3 Claims, 6 Drawing Sheets

US 6,354,649 B1

MONITOR INSTALLED IN DASH PANEL OF AUTOMOBILE AND ITS USAGE

This application is a continuation of copending application(s) International Application PCT/KR99/00044 filed on Feb. 2, 1999 and which designated the U.S., claims the benefit thereof and incorporates the same by reference.

TECHNICAL FIELD

The present invention relates to a monitor for automobiles. Particularly, this invention deals with a monitor and its usage, which is selectively foldingly or unfoldingly installed in a reception space of an automobile's dash panel, to thereby efficiently utilize the installation space in the inside of automobile, as well as to enable a driver to watch the monitor without hindering his front view for the purpose of safe driving.

BACKGROUND ART

With the development of information communication industries, TV broadcasting or various kinds of information, such as traffic, road or road network, can be viewed through a monitor in a car, the monitor of LCD being minimized in volume and weight. For such information, the monitor is preferably installed at a place inside the car where a driver is easily able to find it with his eyes while traveling. In an existing car, an information apparatus or sound machine integrally formed with monitor and machine is located in the center fascia placed in the lower portion of the dash panel provided lengthwise in front of the driver seat. Otherwise, onto the dash panel the information apparatus integrally formed with a monitor is directly attached with a screw or adhesive.

In case of installing the monitor on the center fascia as in the former, it is destined to be located in the lower position so that front observation cannot be performed even for a moment because of apparatus operation or information confirmation through eyes, possibly involving big accident.

When the monitor is placed in the upper portion of the dash panel, it is located at the height of driver's eyes for easy confirmation of information with eyes. However, in this state, the information apparatus including the monitor is always protrudently installed to blind part of the driver's view while driving. In addition, for instance, if passengers collide with the information apparatus due to car crash (including rear-end collision, or abrupt braking, severe injury may happen.

DISCLOSURE OF INVENTION

Therefore, in order to overcome such drawbacks of the prior art, an objective of the present invention is to provide a monitor for automobile and its usage, in welch an information apparatus and monitor are separately provided, the information apparatus being installed in the center fascia, the monitor being selectively foldingly or unfoldingly installed in a reception space of the automobile's dash panel, to thereby efficiently utilize the installation space in the inside of automobile, as well as to enable a driver to watch the monitor without hindering his front view for the purpose of safe driving.

To accomplish the objective of the present invention, there is provided a monitor installed in automobile's dash panel, comprising: a reception member inserted in the upper portion of the dash panel, the member having a predetermined space and opened top; a lid hinged on one side of the reception member so that it is selectively opened or closed; lid opening means for controlling the opening or closing the lid; and a monitor installed in the reception member and hinged on the top inner surface of the lid so that it becomes selectively erect when the lid is opened.

The lid opening means comprises: a roller installed on both lower sides of the monitor for moving the lower portion of the monitor to a predetermined position along the bottom of the reception member so that the monitor stands erect or lies; a horizontal plate having a guiding groove for leading the roller, the plate being placed directly above the roller so that the monitor is mounted thereon; a winding rope connected to the roller at a predetermined length; a winding motor for pulling the roller and closing the lid by rolling the rope; and a manipulation switch for rotating the motor forward or reversely. The lid is not protruded at the same plane as the dash panel when closed.

According to another aspect of the present invention, a usage of a monitor installed in an automobile's dash panel, comprises the steps of: rotating forward a winding motor by pressing a manipulation switch to thereby watch the monitor; making rope wound around the motor become loose due to the forward rotation of the motor; moving a roller connected to the rope to a predetermined position when the rope becomes loose; opening a lid and standing the monitor mounted in a reception member; pressing the switch to reversely rotate the motor so that the monitor is accepted; making the motor wind the rope due to the reverse rotation of the motor; moving the roller connected to the rope to a predetermined position due to the rolling of the rope; and closing the lid and mounting the monitor in the reception member due to the movement of the roller.

BEST MODE FOR CARRYING OUT OF THE INVENTION

Hereinafter, a preferred embodiment of the present invention will be described with the attached drawings.

Figure 1:
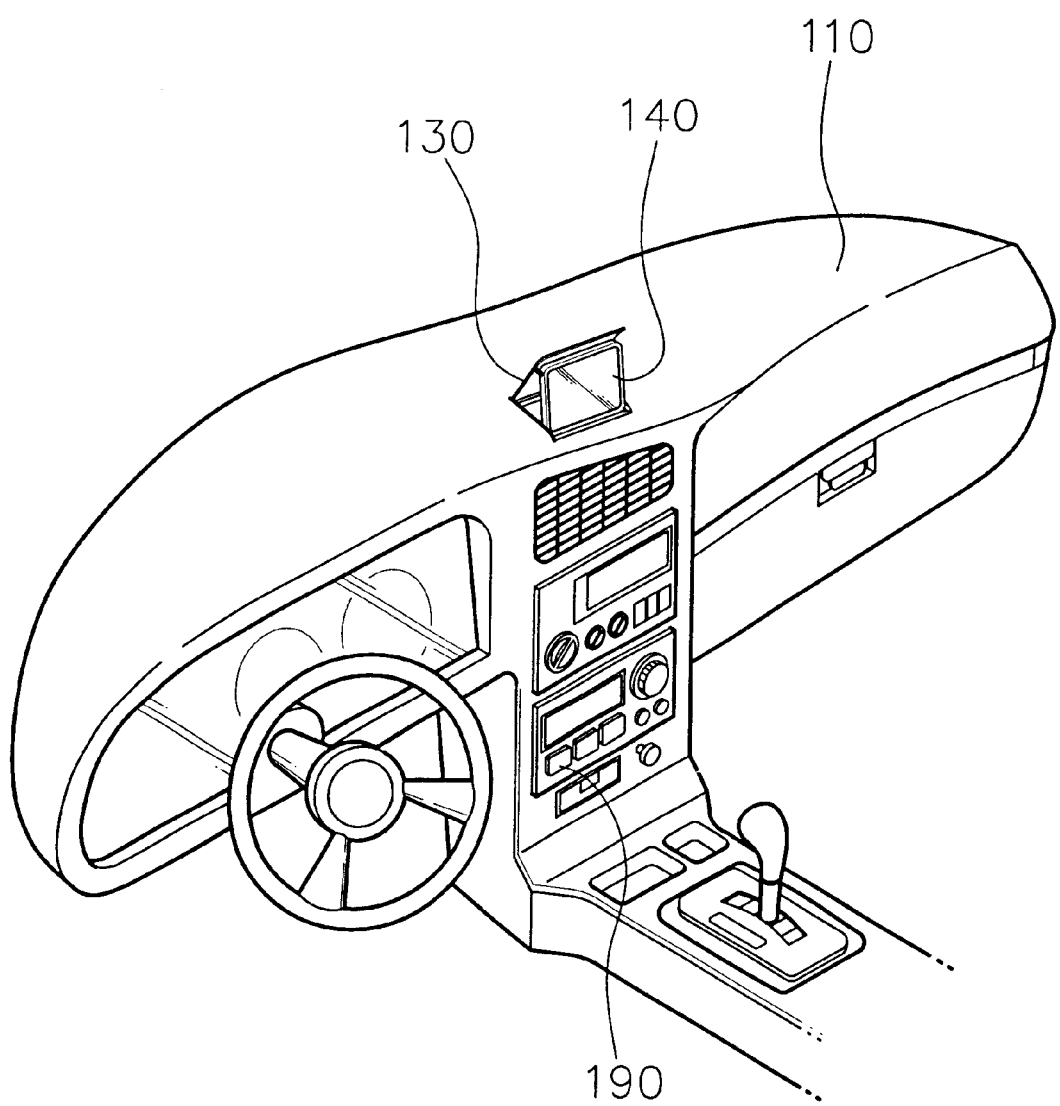
FIG. 1 is a perspective of a state in which one embodiment of the monitor of the present invention is installed.
Figure 2:
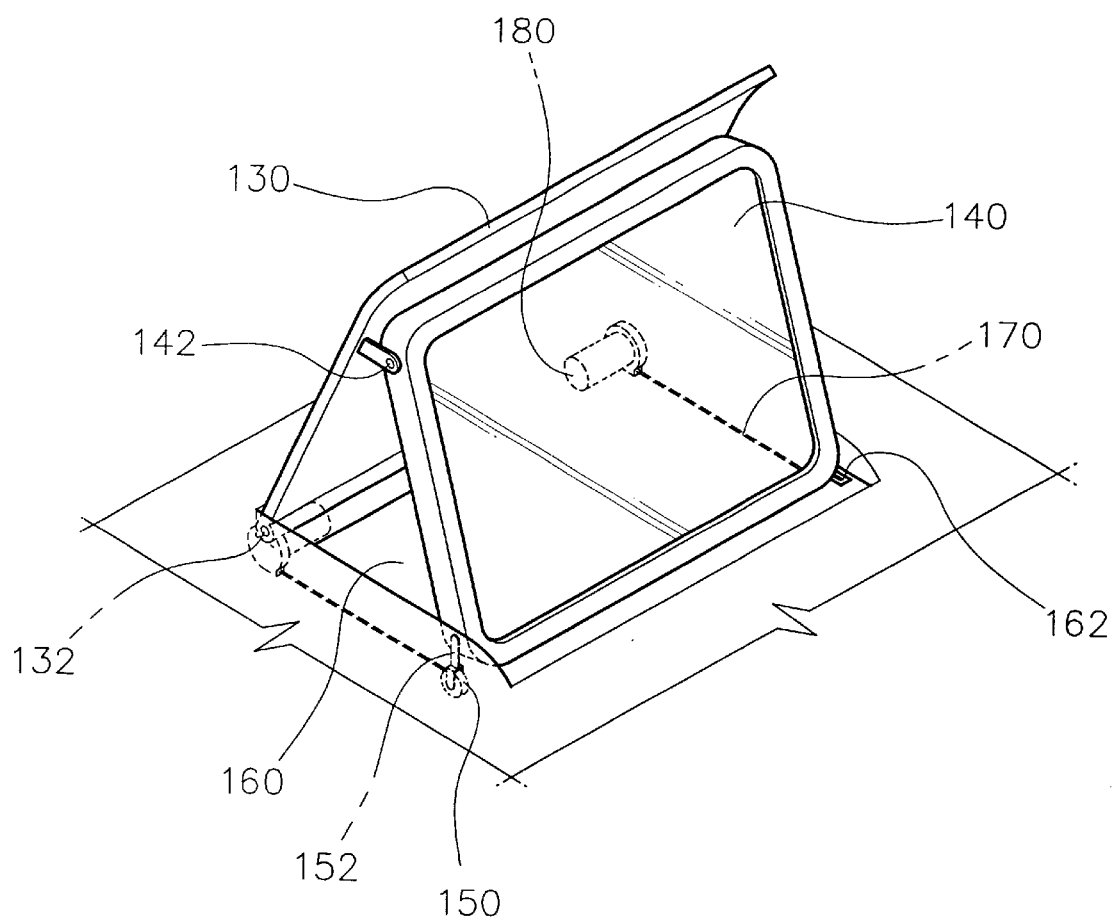
FIG. 2 is a perspective of the embodiment of monitor of the present invention.
Figure 3:
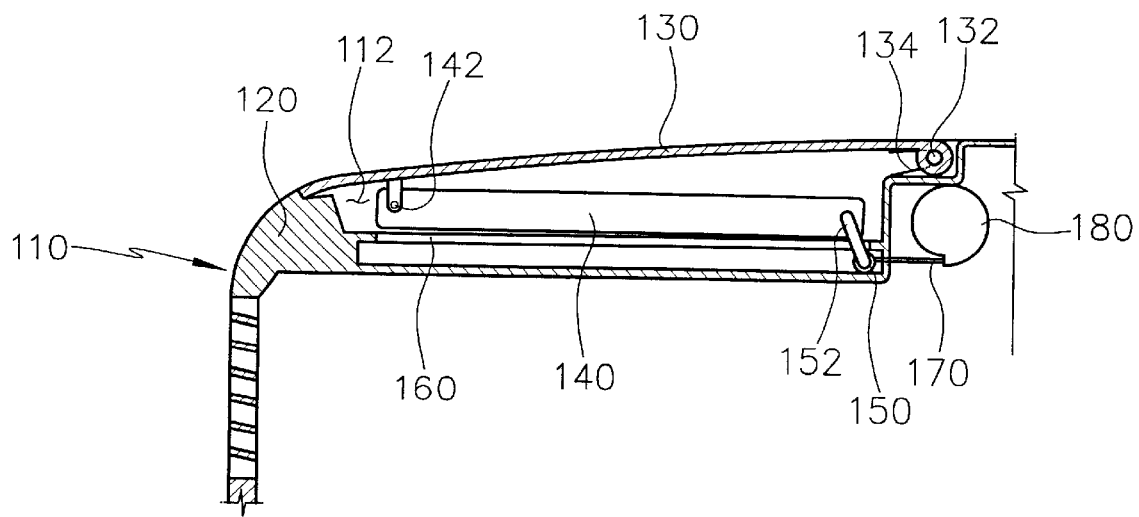
FIGS. 3 and 4 are vertical sections respectively showing states in which the lid of the present invention is opened/closed.
Figure 4:
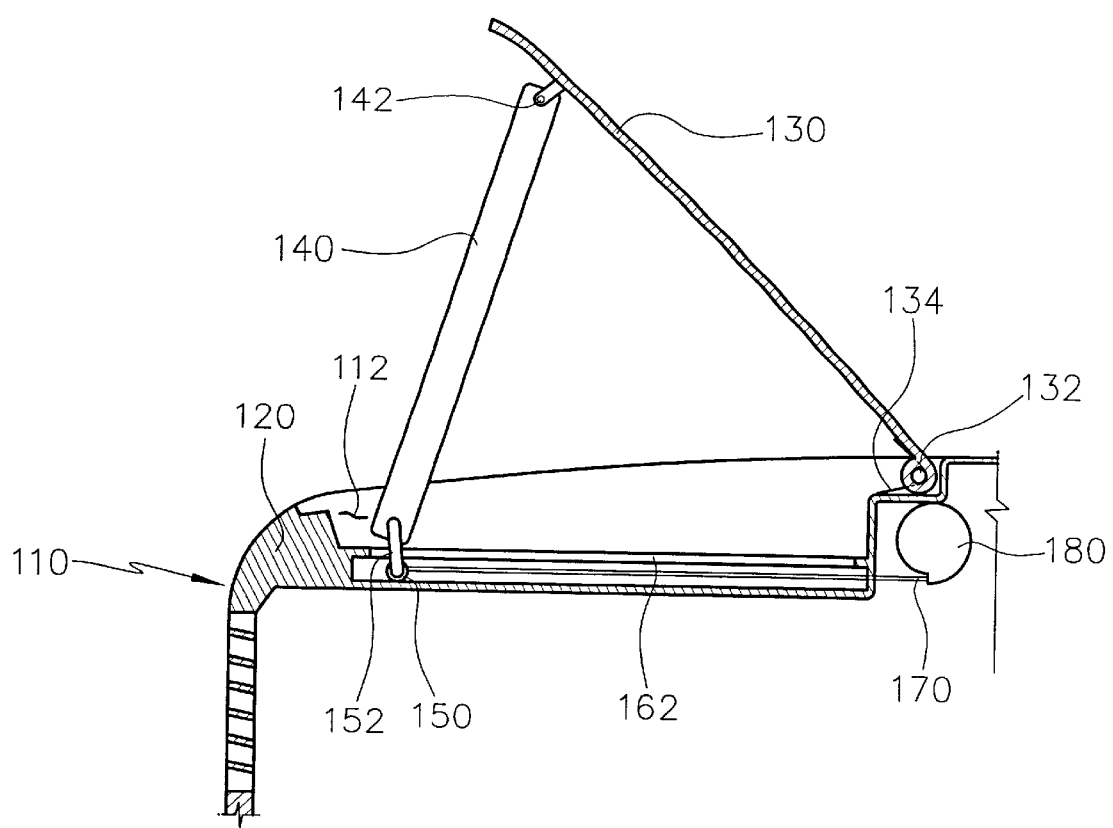
Figure 5:
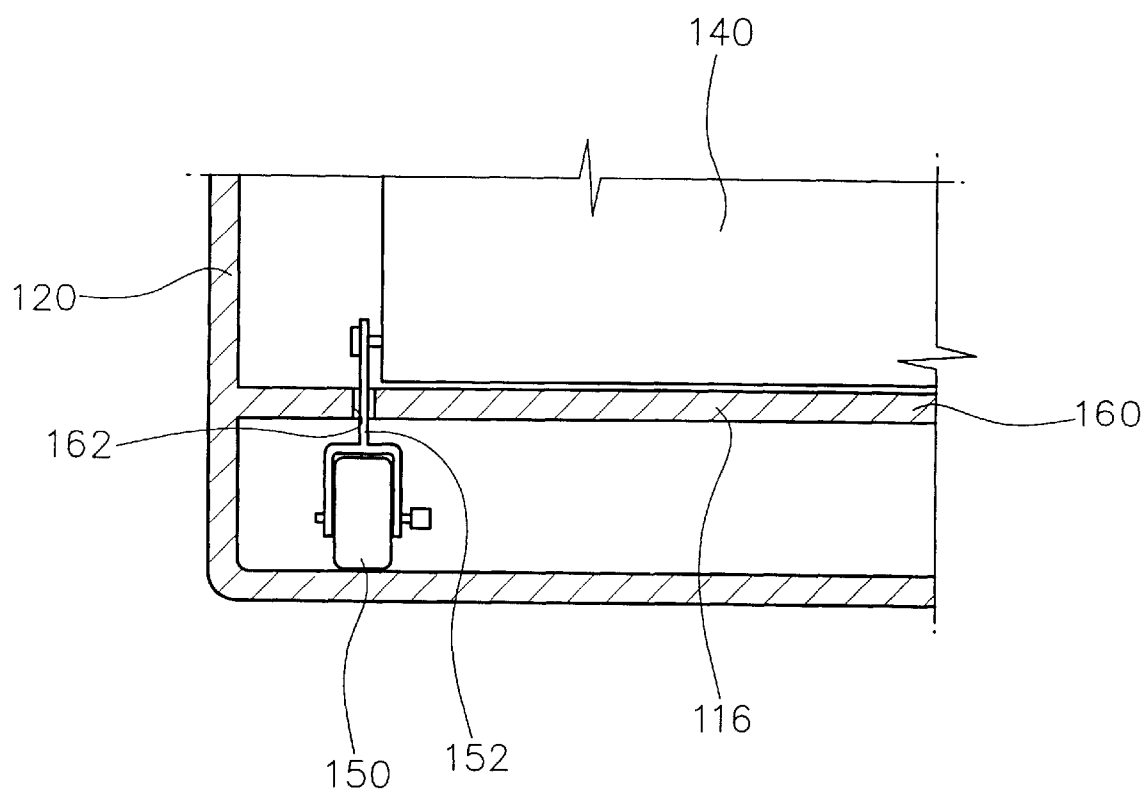
FIG. 5 is a vertical section of the roller of the present invention.

Referring to FIGS. 1–5, the monitor of the present invention comprises: a reception case 120 internally installed in the upper portion of dash panel 110, the case having a predetermined space and its top being opened; a lid 130 hinged on one side of reception case 120 so that it is selectively opened or closed; a monitor 140 hinged on the top inner surface of lid 130 so that it is accepted in reception case 120 and at the same time selectively stands erect when lid 130 is opened; and an apparatus for controlling the opening or closing of lid 130.

In the above construction, more specifically reception case 120 is inserted in an incision 112 formed on the top surface of dash panel 110, the reception case having a space whose top is opened.

The lid 130, hinged on one top end of reception case 120, is designed to ratate to selectively open or close reception case 120. Here, hinged 132 of lid 130 has a return spring 134 so that a resilient force is always provided to open lid 130. It is preferable that when lid 130 is closed to cover monitor 140, the top of lid 130 be not protruded from the top surface of dash panel 110 for better exterior.

Monitor 140 is rotably installed on the top inner surface of lid 130. The top of monitor 140 is hinged on the inner surface of lid 130. A roller 150 is installed below monitor 140. The lower portion of monitor 140 is designed to move to a predetermined position by roller 150, centering on hinge 142.

In order to mount monitor 140 in reception case 120 or stand it by closing or opening lid 130, the following construction is provided. First of all, roller 150 is installed on both lower sides of monitor 140 with a shaft, being supported by prop 152. Roller is designed to act to move the lower portion of monitor 140 to a predetermined position along the bottom of reception case 120 so that monitor 140 stands or lies. Here, while roller 150 moves left and right, monitor 140 can stand or be mounted in reception case 120. Therefore, lid 130 hinged on monitor 140 also moves along with monitor 140 so that it is not exposed externally.

A horizontal plate 160 is provided directly above roller 150 inside reception case 120 and has a guiding groove 162 in its web 116 for leading roller 150. This guiding groove 162 has a prop 152 for supporting roller 150, inserted therein. The groove acts to facilitate the movement of roller 150 by guiding prop 152.

Winding rope 170 is connected to roller 150 at a predetermined length. A winding motor 180 rolls winding rope 170 to its rotation shaft (not shown) to pull roller 150 so that monitor 140 is mounted on horizontal plate 160 and simultaneously lid 130 is closed.

A manipulation switch 190 rotates winding motor 180 forward or reversely. This switch is preferably placed in the vicinity of driver's hands.

A usage of the monitor installed in the dash panel of automobile is explained below according to the embodiment of the present invention.

Figure 6:
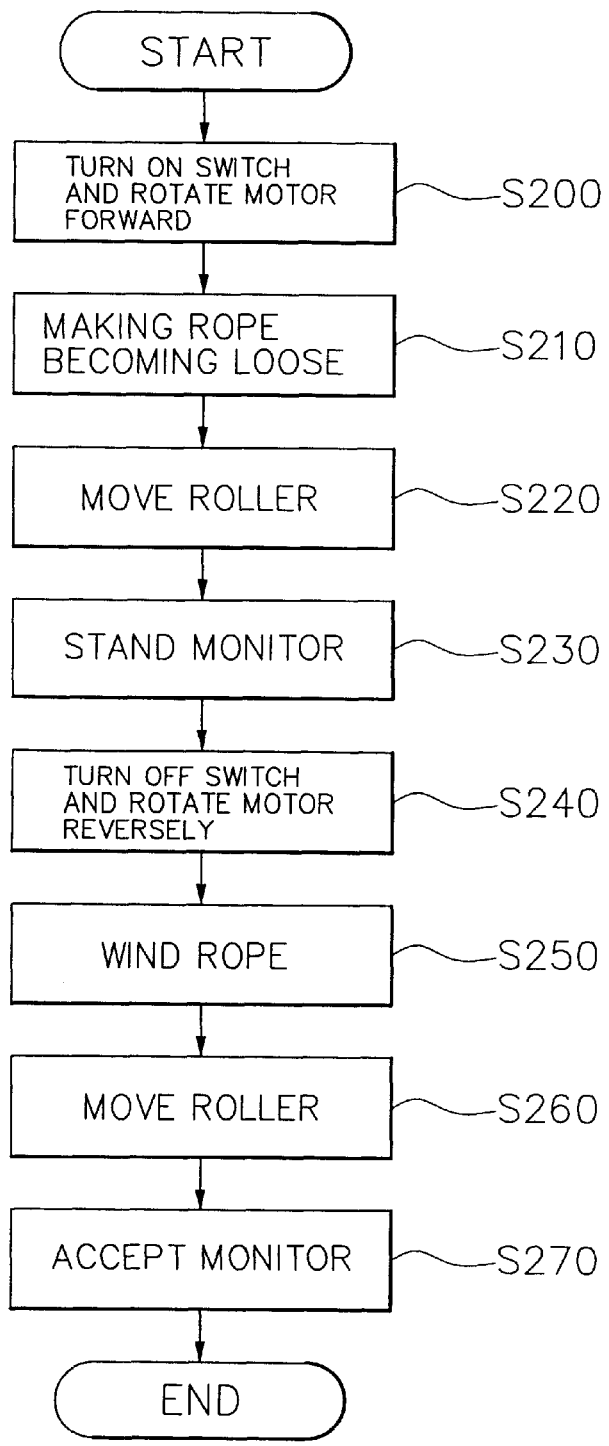
FIG. 6 is a flowchart of showing the usage of the monitor according to the present invention.

Referring to FIGS. 1–6, during a normal traveling in which information needs not to be confirmed through monitor 140, monitor 140 is kept inside dash panel 110, and manipulation switch 190 is turned OFF. In this state, in order to view monitor 140, for instance, to watch TV or confirm various kinds of information on road network while traveling, the driver rotates forward winding motor 180 by pressing switch 190 in step S200. In step S210 winding rope 170 wound around motor 180 becomes loose due to the forward rotation of motor 180.

When rope 170 becomes loose, roller 150 connected to rope 170 moves to a predetermined position in step S220. When the roller moves, lid 130 is opened and at the same time monitor 140 mounted in reception case 120 stands erect in step S230.

After the use of monitor 140, the user presses switch 190 in step S240 in order to rotate motor 180 reversely so that the monitor is accepted in reception case 120.

Due to the reverse rotation of motor 180, it rolls rope 170 in step S250.

In step S260 rope 170 is wound to move roller 150 connected to the rope 170.

With the movement of roller 150, lid 130 is closed and at the same time monitor 140 is mounted in reception case in step S270. As monitor 140 -Is inserted into reception case 120, there does not need is installation space.

As described above, the present invention is constructed with an information apparatus and monitor separately provided. The information apparatus is installed in the center fascia, while e monitor is selectively foldingly or unfoldingly installed in a reception space of the automobile's dash panel, to thereby efficiently utilize the installation space in the inside of automobile, as well as to enable a driver to watch the monitor without hindering his front view for the purpose of safe driving.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. A monitor installed in dash panel of an automobile comprising:

a reception member inserted in an upper portion of the dash panel, the reception member having a predetermined space and opened top;

a lid hinged on one side of the reception member so that the lid is selectively opened or closed;

lid opening means for controlling the opening or closing of the lid; and a monitor installed in the reception member and hinged on a top inner surface of the lid so that the monitor becomes selectively rect when the lid is opened;

wherein:

a roller installed on both lower sides of the monitor for moving a lower portion of the monitor to a predetermined position along a bottom of the reception member so that the monitor stands erect or lies;

a horizontal plate having a guiding groove for leading the roller, the horizontal plate being placed directly above the roller so that the monitor is mounted thereon;

a winding rope connected to the roller at a predetermined length;

a winding motor for pulling the roller and closing the lid by rolling the rope; and a manipulation switch for rotating the winding motor forward or reversely.

2. The monitor as claimed in claim 1, wherein the lid is not protruded at the same plane of the dash panel when closed.

3. In a monitor in an upper portion of an automobile dash panel, the improvements comprising:

a lid hinged on one side to be moved to a position opened from the upper portion of the dash panel or a position closed thereto, a top of the lid not protruding from the upper portion of the dash panel when the lid is in the closed position;

a monitor hinged to a top of the lid in the opened position and on an inside of the lid in the closed position for becoming erected when the lid is in the opened position and having a roller on a lower portion for movement relative to the dash panel as the lid is moved to the opened and closed positions;

means for moving the lid to one of the opened or closed positions;

a rope connected to one of the dash panel and roller; and means on the other of the dash panel and roller winding the rope to pull the roller for the movement relative to the dash panel as the lid is moved to the other of the opened or closed positions.

* * * * *